United States Patent [19]

Immel

[11] 3,759,641

[45] Sept. 18, 1973

[54] PROCESS AND APPARATUS FOR PRE-EXPANDING POLYMER PARTICLES

[75] Inventor: Richard H. Immel, Sewicky, Pa.

[73] Assignee: Sinclair-Koppers Company, Pittsburgh, Pa.

[22] Filed: Jan. 12, 1971

[21] Appl. No.: 105,981

Related U.S. Application Data

[62] Division of Ser. No. 765,342, Oct. 7, 1968, Pat. No. 3,577,360.

[52] U.S. Cl. .................................. 425/4, 432/13
[51] Int. Cl. .............................................. F27b 3/22
[58] Field of Search ...................... 263/21 A, 21 B; 264/51, 53

[56] References Cited
UNITED STATES PATENTS 3,262,686  7/1966  Kraus et al. ..................... 263/21 B
3,062,759  11/1962  Bingham et al. ................. 264/53 X
3,121,911  2/1964  Lightner .......................... 264/53 X

*Primary Examiner*—John J. Camby
*Attorney*—Olin E. Williams

[57] ABSTRACT

An apparatus and process are provided for expanding polymeric particles to a predetermined density, which particles are subject to further expansion. Agitated particulate expandable polymer is heated in a dry atmosphere in a closed vessel, under vacuum, to a predetermined density. To achieve ultra-low density expandable prepuff, a coolant such as water is introduced into the closed vessel after the predetermined density is reached, but prior to the release of the vacuum. Following release of the vacuum, the beads are removed from the closed vessel and may be molded directly, without any aging period such as that necessary following steam pre-expansion.

3 Claims, 7 Drawing Figures

PROCESS AND APPARATUS FOR PRE-EXPANDING POLYMER PARTICLES

CROSS REFERENCE TO RELATED APPLICATIONS

This is a division of application Ser. No. 765,342, filed Oct. 7, 1968, now U.S. Pat. No. 3,577,360.

BACKGROUND OF THE INVENTION

In the conventional production of foamable or expandable polystyrene, expandable particles are exposed to the action of atmospheric steam, such as is described in U. S. Pat. No. 3,023,175. The steam contact causes partial volatilization of the hydrocarbon blowing agent and produces incompletely expanded particulate polymer particles. Such pre-expansion results in the need for aging the beads for extended periods of time, on the order of a 24 hour time period, prior to their use in molding of foam articles, or irregular foaming will occur in the mold.

Such conventional pre-expansion is inefficient in that the contact time of beads with steam varies extensively in a pre-expander and over exposure results in loss of volatiles in different amounts for different bead quantities. Also, the minimum density that is practically achievable in a single prepuff cycle is in the order of about 1 pound per cubic foot.

It has now been found that by following the present invention, expandable polymers can be partially expanded in the absence of steam, thus requiring little or no aging time. The present invention provides for easy control of the density of prepuff, with resultant improved density gradients in articles produced from the prepuff, and surprisingly a decrease in the cooling time for articles molded from the fresh prepuff prepared by the present invention. In addition, the present invention can be used to prepare ultra-low density prepuff, in the order of 0.4–0.75 pounds per cubic foot, heretofore unobtainable by a single prepuff cycle using conventional processes.

SUMMARY OF THE INVENTION

Particulate foamable polymer particles, containing an aliphatic blowing agent, are pre-expanded to a predetermined density by heating the particles in a closed vessel, under agitation in a substantially dry atmosphere, to a temperature high enough to soften the polymer particles and cause a partial volatilization of the hydrocarbon from the particles. The heated, agitated particles are then subjected to a vacuum, within the closed vessel, for a time sufficient to expand the particles to the desired density, the vacuum released and the particles removed from the vessel. To produce ultra-low densities, between about 0.4 to 0.75 pounds per cubic foot, a coolant, such as water, is injected into the vessel following the desired expansion, but prior to the release of the vacuum.

The apparatus suitable for the pre-expansion comprises a closed vessel for containing the particulate polymer particles in a substantially dry atmosphere, a charging means to feed the polymer particles to the closed vessel, agitation and heating means, and a vacuum source to subject the heated, agitated particles to vacuum. Means are provided also to release the vacuum and to discharge the pre-expanded particles from the closed space. To produce ultra-low density particles, a charging means is needed to feed the desired amount of coolant to the vessel prior to release of the vacuum.

DETAILED DESCRIPTION

Figure 1:
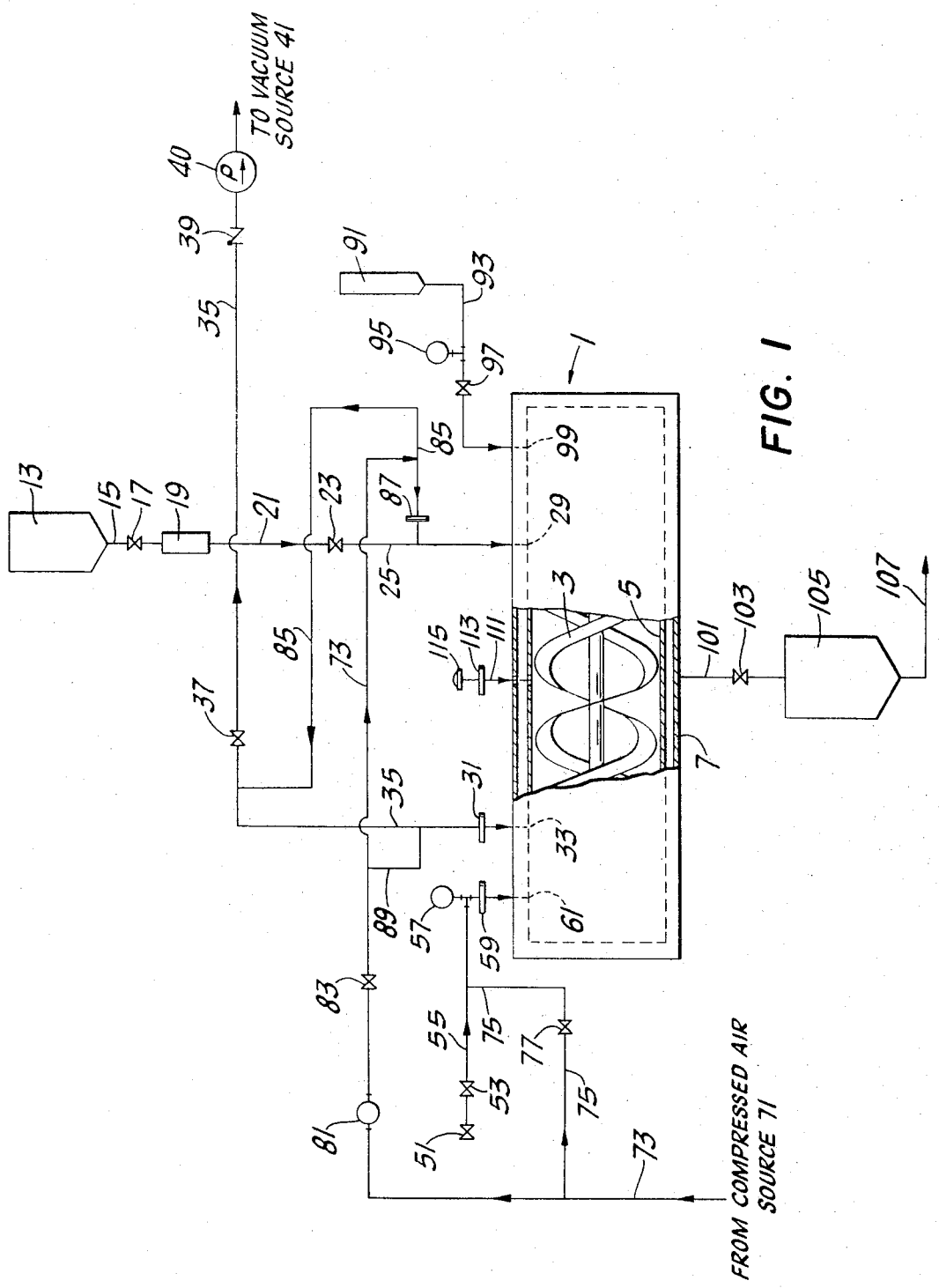
FIG. 1 is a schematic illustration of the novel process of the present invention.
Figure 2:
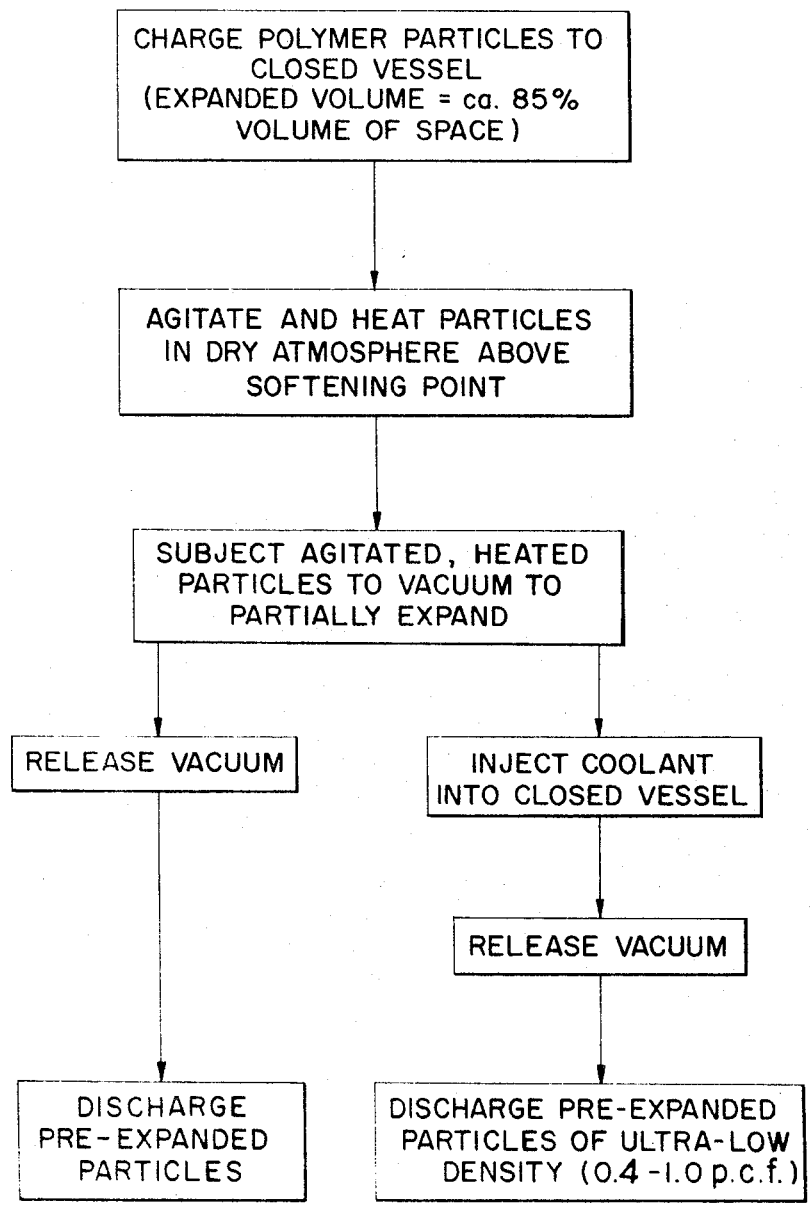
FIG. 2 is a flow diagram of the novel process of the present invention illustrating the method by which ultra-low density prepuff is produced.

The apparatus of the present invention is schematically illustrated in FIG. 1. Shown therein is a closed vessel 1, herein a horizontally disposed cylindrical ribbon blender with agitation means 3. To prevent sticking or clustering of the pre-expanded softened beads, during the heating period, the vessel may be coated on the inside 5 with a suitable material such as Teflon.

The vessel 1 has attached thereto a feed means for charging of the particulate polymer to the vessel. The virgin bead feed should be determined so that the charge, when fully expanded to the desired density gives a pre-puff volume less (about 85 percent) than the inside expander volume. This prevent the possibility of plugging the expander and fusion of the beads into a foamed mass. The feed means herein comprises a hopper 13 for the polymer particles. The particles flow from hopper 13 through line 15 and valve 17 to a volumetric feed chamber 19 that will control the amount of particles charged to vessel 1. From the chamber 19, the beads flow through line 21 and valve 23 to line 25 and enter the vessel at port 29. In the illustrated apparatus, the particles are gravity fed although other means of feeding the particles would be usable.

The particles are agitated in vessel 1 by agitation means 3, herein a ribbon blender. The means of agitation is not critical, but it is imperative that agitation be provided for the particulate polymer to prevent lumping or sticking of the softened beads during the pre-expansion.

The particles, in the vessel 1, are then heated by conduction through the use of a steam jacket 7, or a heating bath, which heats the outside of the vessel 1 and through conduction, the agitated particles of expandable polymer. The inside of the vessel is thus kept dry and the particles heated in a substantially dry atmosphere.

When the agitated polymer particles have been heated to the desired temperature, generally between the range of 175°–220° F. for expandable polystyrene, the vacuum source 41 is activated so as to pull a vacuum in the vessel 1. Vacuum source 41, such as a conventional vacuum pump is attached to the vessel at port 33 by means of line 35, which has therein valves 37 and 39 and pressure gauge 40 to better control the amount of vacuum.

Also in line 35 is a flange 31 which prevents entrance of beads into line 35 from vessel 1 when the vacuum source is activated. It has been found that the use of a single line for pulling the vacuum tends to result in plugging of the port 33 and it is thus advantageous to have more then one line for pulling vacuum within the vessel 1. As illustrated, this can be accomplished by having additional line 85 which is connected to line 25 of the feeding system. When the vacuum is to be pulled, the valve 23 in line 25 is closed and the interior of the vessel 1 will be subject to vacuum through port 29, line 25, flange 87, and line 85 as well as through port 33.

Following the heating period, under vacuum, of the particulate polymer during which a substantial amount of the aliphatic blowing agent is removed from the polymer but the polymer retains its particulate nature, the vacuum is released by venting the vessel to the atmosphere. This is accomplished by means of vent 51, provided on line 55 which contains valve 53 generally in closed position. To vent, valve 53 is opened and atmospheric air enters the system. After venting the vessel to the atmosphere, the particulate polymer must be removed from the vessel 1. To accomplish the removal, a compressed air source 71 is provided which forces air, under pressure, through line 73 to force the particulate material from the vessel. The valve 37 is closed, to vacuum source 41, and air forced through line 73, to line 75 through opened valve 77 and line 55, having a pressure gauge 57 thereon, to flange 59 and through port 61 into the vessel 1. Also, air is forced from line 73, having gauge 81, through opened valve 83 through line 89 to line 35 and through line 35, flange 31 and port 33 into the vessel 1. In addition, air is forced from line 73 to line 85 and will flow partially to line 35 and partially through line 85 and flange 87 to line 25 (valve 23 in line 25 being closed) to port 39 and into the vessel 1. Providing for pressurized air to flow through flanges 59 and 31 removes the danger of the flanges becoming clogged by polymer.

When the pressurized air is fed to the vessel 1, valve 103, being opened will permit the flow of air and the pre-expanded particulate polymer through line 101 and valve 103 and into a collecting bin 105 from which it is removed through line 107 either to a storage facility, or if desired, directly to a molding apparatus.

Also provided on the vessel for safety reasons is a release valve 115 attached by means of flange 113 and line 111.

In the production of ultra-low density prepuff, where a coolant is injected into the closed vessel 1, prior to vacuum release, as described in more detail (hereinafter) a feeder 91 is provided, the feeder 91 being connected to vessel 1 by means of line 93, having valve 97 and gauge 95 thereon and port 99. The feeder 91 is adapted so as to allow the feeding of a coolant, such as water or other coolant, into the vessel while the vessel is under a vacuum.

The process of the present invention is useful for producing expandable polymer particles of conventional densities or of ultra-low density. These partially expanded beads, conventionally termed prepuff, are beads expanded to a density generally comparable to that of the molded article produced when such beads are fused into an article by conventional molding methods.

Foamable particulate polymer material that can be pre-expanded by the present process and apparatus includes homopolymers and copolymers derived from vinyl monomers, including styrene, vinyl chloride, divinylbenzene, alpha-methylstyrene, nuclear dimethylstyrenes, vinyl naphthalenes, and the like. Especailly suitable are polystyrene and copolymers of polystyrene with such monomers as alpha-methylstyrene, divinylbenzene, butadiene, isobutylene, and acrylonitrile, having about 50 percent or more styrene therein. These foamable materials have incorporated therein, as expanding agent, a volatile aliphatic or cycloalphatic hydrocarbon, having 1-7 carbon atoms in the molecule, such as methane, ethane, propane, butane, pentane, hexane, heptane, petroleum ether, cyclopentane, cyclohexane, cyclopentadiene, and their halogenated derivatives which have a boiling point below the softening point of the polymer such as dichloroethylene, isopropyl chloride, methylchloride, dichloroethane, dichlorodifluoromethane and the like. Other suitable blowing agents are acetone, methanol, methyl acetate, ethyl acetate, methyl formate, ethyl formate, propionaldehyde, dipropyl ether and the like and mixtures thereof which have a boiling point lower than the softening point of the polymer. The expanding agent generally is present in an amount of 3–15 parts by weight of the polymer.

The foamable particulate polymer particles are charged to a closed vessel, adapted to be evacuated by a vacuum pump and are subjected to agitation and heat. Agitation is provided to the extent of causing movement of the particulate polymer particles relative to each other to prevent the particles from sticking to each other or agglomerating when the particles are in a heated, softened state.

Such agitation is, of course, related to the amount of beads charged, the particulate polymer and other process conditions. The atmosphere surrounding the beads should be substantially dry, that is free of added steam or other vapors such as those used in conventional expanding processes.

The temperature used in the expansion process will also be dependent upon the type of polymer being processed. For homopolystyrene expandable particles, heating generally to a temperature of about 175°–180° F. will soften the polymer and temperatures of up to about 210°–220° F. or higher can be used provided sufficient agitation and other process variables are provided.

The time that the particulate matter polymer particles are subjected to heat prior to pulling a vacuum and the time they are held under the influence of a vacuum also is dependent upon the temperature, type of polymer, the volatile content of the beads and other process variables. An increase in the preheat time generally decreases the final prepuff density providing the remaining process variables are held constant.

Following the desired preheat period, the agitated heated particles are subjected to a vacuum. The degree of vacuum desirable for any particular polymer density is also dependent upon the temperature time relationship for any type of polymer. It has been found that if other variables are kept constant, increasing the amount of vacuum applied decreases the density of the prepuff. An especially desirable degree of vacuum has been found to be a vacuum comparable to about between 10–25 inches of mercury, although somewhat larger or smaller degrees are usable.

In order to produce ultra-low density prepuff, the order of 0.4–0.75 pounds per cubic foot, it is necessary that the collapse of the beads or prepuff shrinkage be eliminated. This is achieved by the present process which adds a coolant to the pre-expander, while the heated expanded beads are subject to a vacuum, when the beads are already or nearly completely expanded. The physical phenomenon that is occurring may be the result of cooling of the prepuff surface, thereby causing the surface cells to harden before shrinkage can occur. The preferred coolant is water, because of its availability and for economic considerations, although other coolants could be usable provided they gave the desired cooling effect to the prepuff in its heated state and while under the influence of vacuum.

The amount of coolant, preferably water, added to the closed vessel while the heated beads are still subject to vacuum, will vary relative to the amount of beads in the vessel and the size of the vessel. The amount of coolant should be such that, in the vapor state, there is sufficient coolant to occupy the volume of the vessel at the temperature and degree of vacuum present. When water is used, this is determined by calculating the quantity of water that will turn to steam at the particular temperature and degree of vacuum being used. This amount of water, although added to the beads, does not result in wet prepuff, but the prepuff, when removed from the vessel, will be dry to the touch. Too much water could produce wet prepuff, while too little water would not result in cooling of all bead surfaces and retention of the ultra-low density.

The following examples further illustrate the present invention.

EXAMPLE I

As an example of the present process, a 25-gallon capacity prototype of the apparatus of the present invention was used to pre-expand expandable polystyrene beads. The apparatus comprised a 25-gallon (3.34 cu. ft.) cylindrical, horizontal ribbon blender designed for vacuum and jacketed for steam heating at pressures up to 100 psig., generally as illustrated in FIG. 1. The 25-gallon vessel had an interior coating of Teflon to reduce sticking of heated beads to the interior walls. Agitation speeds usable on the prototype ranged between 60 RPM and 280 RPM. The vacuum source was a pump (Nash Cl-203) that permitted the application of about a 25 in. Hg vacuum within the vessel in 5–7 seconds. The vessel was also equipped with a feeder for a controlled amount of water to act as coolant and produce ultra-low density prepuff.

Figure 3:
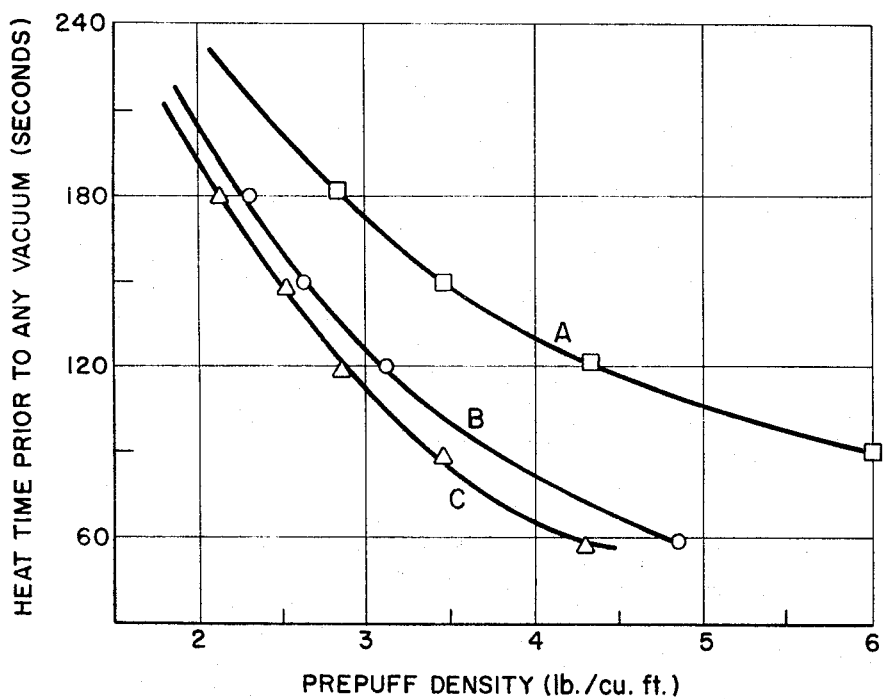
FIG. 3 is a graphic illustration of the effect of expanding in the presence of a vacuum as compared with expansion without a vacuum present.

A series of prepuff expansions were run in the 25-gallon prototype to show the effect of the vacuum on the final density in contrast to particulate polymers expanded without being subject to vacuum. The particulate polymer comprised Dylite expandable polystyrene beads (F-40-B) containing 6.4 percent n-pentane as expanding agent. One pound of beads was charged to the vessel having a steam jacket with steam at a pressure of 13 psig. (ca 245° F.). This steam jacket temperature is sufficient to provide a temperature in the interior of the vessel of about 20°–30° F. less than that of the jacket. In one set of experiments (A), the beads were heated for the desired length of time in the vessel without any vacuum, held the desired amount of time and discharged from the vessel. In a second set of experiments (B), the beads were heated and subjected to a vacuum equal to 25 in. mercury, then the vacuum vented during a 10-second period followed by bead discharge. A third set of experiments (C), were run identical to the second set and the vacuum vented during a 15-second time period. The results of the above three sets of experiments are graphically illustrated in FIG. 3. As is seen from the results, the use of a vacuum during the expansion of the foamable particulate material results in the production of prepuff of a lower density than when no vacuum is used. Also, a slight increase in the vent time of the vacuum also has an effect in preventing collapse of the prepuff with a resultant lower prepuff product density.

EXAMPLE II

Figure 4:
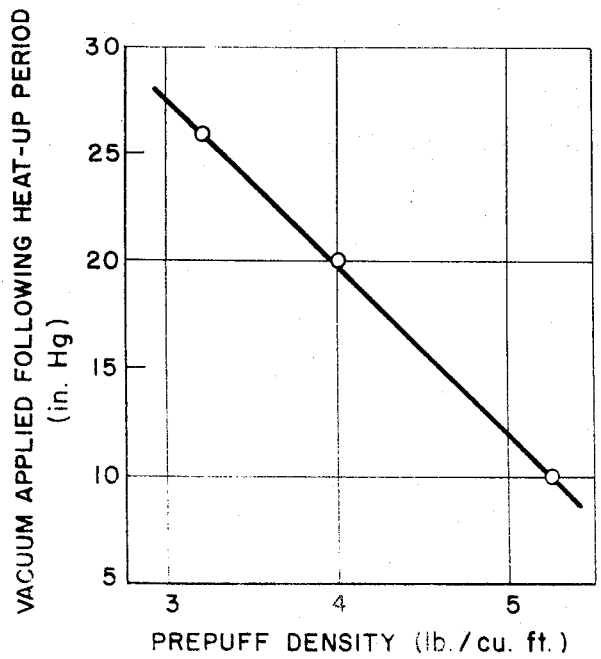
FIG. 4 is a graphic illustration of the effect of the degree of the vacuum present during the process of the present invention.

As graphically shown in FIG. 4, the degree of vacuum also has an effect upon the final prepuff density where other conditions are held constant. The apparatus, quality and quantity of expandable beads used in Example I were used under the following conditions: steam jacket pressure 12 psig. (ca. 244° F.); time for heating prior to pulling vacuum, 60 seconds; time to vent the vessel, 25 seconds. As shown by the results, illustrated in FIG. 4, the final density of the partially expanded prepuff is found to decrease linearly as the amount of vacuum applied is increased.

For the production of ultra-low density partially expanded particulate polymers, it has been found that when using vacuum in the expansion, a coolant, such as water, should be added to the closed vessel at a time following the heating and desired amount of expansion, but prior to the release of the vacuum. It appears that although the particulate particles can be expanded to very low densities in the vessel, upon exposure to the air, by venting the vessel to the atmosphere, shrinkage or collapse occurs increasing the density of the product. Thus, the actual density of the discharged prepuff would be greater than about 1.0 pounds per cubic foot. However, product densities as low as 0.40 lbs./cu. ft. have been produced by the process of the present invention wherein a coolant is added prior to vacuum release. Because the saturation temperature of steam at 15–25 in. mercury vacuum is lower than it is under atmospheric conditions and also lower than the prepuff temperature in the vessel, the water vapor cools the prepuff surface and probably causes the surface cells to harden before any substantial shrinkage can occur.

EXAMPLE III

Figure 5:
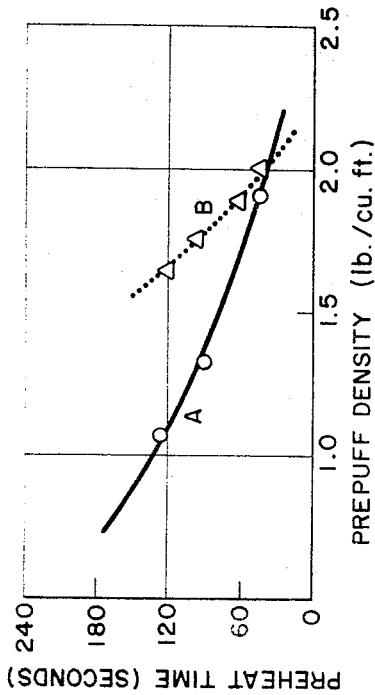
FIG. 5 graphically illustrates the effect of adding a coolant to the vessel, prior to vacuum release, producing ultra-low prepuff of a density as low as 0.4 pounds per cubic foot.

The effect of the addition of water to the vessel after heating of the prepuff and vacuum expansion, but prior to vacuum release, is illustrated in FIG. 5. In FIG. 5, there is graphically illustrated a comparison of identical expansion cycles, the only difference being that one (A) incorporates the water addition by which prepuff shrinkage is reduced. The second curve (B) shows the resultant density of prepuff expansion without water addition. The apparatus used was that described in Example I, using 18 psig. jacket pressure steam heating (ca. 255° F.); 1 pound of Dylite expandable polystyrene beads (6.6 percent pentane); a vacuum of 22 in. mercury; and vacuum retention for a period of 30 seconds. In the experiments representing curve B, 30 ml. of water was added after the 30-second vacuum retention time (including the time to pull the vacuum), the water being added during a 20-second time period. The graph illustrates that under the same conditions, by using a controlled water addition, the density of the prepuff product can be significantly reduced; as with 120 seconds preheat time, a density of 1.05 as against a density of 1.65 lbs./cu. ft.

EXAMPLE IV

Figure 6:
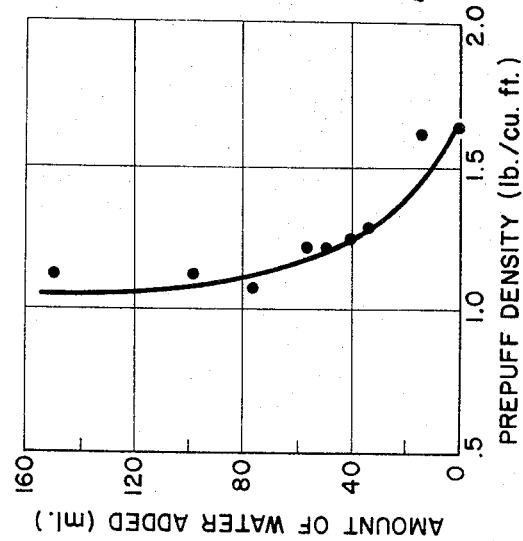
FIG. 6 is a graphic illustration of the effect of the amount of coolant, herein water, added to the vessel to produce ultra-low density prepuff.

A series of experiments were run to determine the effect of different quantities of water added to the vacuum pre-expansion process of the invention, prior to vacuum release. For each use, the apparatus used in Example III was charged with 1 pound quantities of Dylite expandable polystyrene beads (6.95 percent pentane.). The steam jacket pressure used was 17 psig. (ca. 250° F.). In each run, the charge was preheated during 60 seconds, a 22 in. mercury vacuum pulled and held for 30 seconds, the water (varying quantities) added in 20 seconds and the vessel vented to the atmosphere during 15 seconds. As can be seen by reference to FIG. 6, the amount of water added to the pre-expander, prior to vacuum release, effects the final density of the prepuff. It appears that the amount of water is proportional to the volume of the vessel (here 25 gallons) rather than the volume of the bead charge to the vessel and that an upper limit is reached beyond which the water has little or no effect on the product density. For example, using the 25-gallon prototype, the addition of more than about 100 ml. of water has no appreciable effect on the product.

EXAMPLE V

Figure 7:
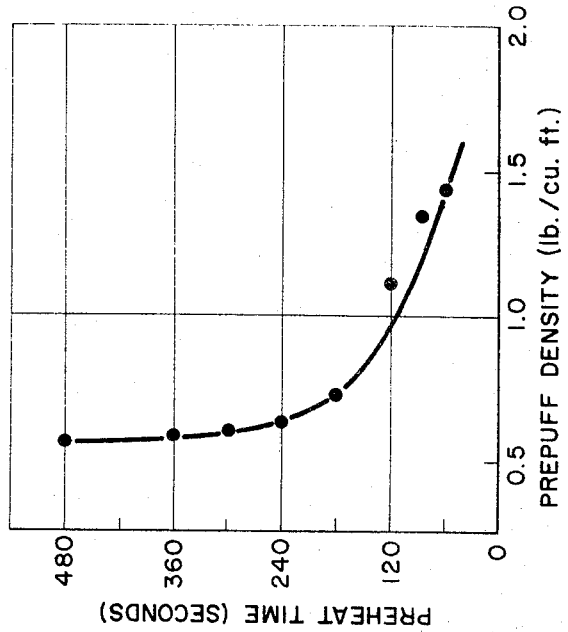
FIG. 7 graphically illustrates the effect of varying the preheating time prior to vacuum on the product density.

By extending the time of the preheating period, with other conditions constant, the density of the prepuff product can be additionally lowered. This is shown in FIG. 7, which is a graphic illustration of a series of experiments using the apparatus, expandable polystyrene charges and the expansion temperature of Example IV, with variation in preheat times. Following the preheat time, a 22 in. mercury vacuum was pulled and held for 30 seconds, 40 ml. of water added to the vessel during 30 seconds, and the vessel vented to the atmosphere during a 20-second period.

EXAMPLE VI

A series of moldings were made using fresh prepuff from a steam expansion process as described in U. S. Pat. No. 3,023,175 to Rodman, and fresh prepuff prepared generally according to the novel vacuum procedure of Example I. Identical virgin bead samples were used in all cases for comparison. Four-inch thick 8 inch diameter discs were molded under identical conditions in a press. The results are listed in Table I and were as follows:

TABLE I

| experiment | Expansion Method | Density (pcf.) | Molding Conditions Header Pressure | Molding Conditions Back Pressure | Cool Cycle (min.) |
|---|---|---|---|---|---|
| A | Steam | 2.0 | 30 | 20 | 11.0 |
|  | Example I | 2.0 | 30 | 20 | 6.0 |
| B | Steam | 2.0 | 28 | 20 | 12.0 |
|  | Example I | 2.0 | 28 | 20 | 6.5 |
| C | Steam | 2.1 | 25 | 20 | 15.0 |
|  | Example I | 2.1 | 25 | 20 | 5.5 |

The fusion of the prepuff prepared according to the Example I was as good as or better than the steam-expanded moldings. As is seen from the results, the prepuff prepared according to the present invention, when molded fresh, gives a reduction of 50–60 percent in the cool cycle compared with freshly molded, steam-expanded prepuff at the same density.

EXAMPLE VII

Experiments were made to compare the density gradient of molded blocks formed from prepuff prepared by the present process with the density gradient of molded blocks formed from steam expanded prepuff, according to U. S. Pat. No. 3,023,175. To determine the density gradient, billets were molded from the expandable polystyrene (Dylite F-40b) under the same molding conditions and a 2" × 24½" × 17 3/32" center cut made from the billets. A ¼ inch thick section that included the skins was saw cut from the top and bottom of the removed center cut. The remainder of the piece was cut into 1 inch thick specimens. All parts were weighed and then submerged into a graduated cylinder of water. The displacement in cubic centimeters of water were recorded and densities calculated in pounds per cubic foot. Comparison was made of a molded specimen (A) of 0.68 lb./cu. ft. prepared according to the present invention and a 1.07 lb./cu. ft. (about minimum density obtainable) specimens (B) from steam expanded prepuff. The results of the density determinations are listed in Table II.

TABLE II

|  | A | B |
|---|---|---|
| Prepuff Density (lb./cu. ft.) | 0.68 | 1.07 |
| Density Gradient (lb./cu. ft.) |  |  |
| Top Skin | 1.56 | 1.97 |
| 1 | 0.84 | 1.36 |
| 2 | 0.75 | 1.14 |
| 3 | 0.78 | 1.11 |
| 4 | 0.77 | 1.11 |
| 5 | 0.77 | 1.13 |
| 6 | 0.80 | 1.15 |
| 7 | 0.81 | 1.19 |
| 9 | 0.75 | 1.12 |
| 10 | 0.73 | 1.07 |
| 11 | 0.73 | 1.08 |
| 12 | 0.77 | 1.29 |
| 13 | 0.93 | 1.07 |
| Bottom Skin | 1.37 | 1.53 |

As is seen from the results the density gradient of the molded specimens made from prepuff prepared by the present invention is much more uniform than that of a molded specimen made from conventional steam expanded prepuff.

I claim:

1. Apparatus for partially expanding particulate foamable polymer particles containing an aliphatic blowing agent having a boiling point below the softening point of said polymer to a predetermined density, said particles being capable of further expansion comprising:
    1. a closed vessel for the containing of particulate foamable polymer particles in a substantially dry atmosphere;
    2. a volumetric feed chamber for charging a predetermined quantity of said particles to said closed vessel;
    3. a ribbon-blender for agitating said particles while said particles are in said closed vessel;
    4. a jacket surrounding said vessel for heating said particles in said substantially dry atmosphere while said particles are in said closed vessel;
    5. a vacuum source for subjecting said particles, in said closed vessel to a reduced pressure for a predetermined time to partially expand said particles to said predetermined density;

6. a vent for releasing said vacuum; and 7. a source of compressed air for discharging said partially expanded particulate foamable polymer particles from said closed vessel.

2. The apparatus of claim 1 wherein said vessel has a feeder attached thereon for charging a controlled amount of water to said vessel while said particles in said closed vessel are subjected to said vacuum.

3. Apparatus for partially expanding particulate foamable polymer particles containing an aliphatic blowing agent having a boiling point below the softening point of said polymer to a predetermined density, said particles being capable of further expansion comprising:

1. a substantially horizontally disposed closed vessel for the containing of particulate foamable polymer particles in a substantially dry atmosphere;

2. a volumetric feed chamber for charging a predetermined quantity of said particles to said closed vessel;

3. a ribbon blender for agitating said particles while said particles are in said closed vessel;

4. a jacket surrounding said vessel for heating said particles by conduction heating in said substantially dry atmosphere while said particles are in said closed vessel;

5. a vacuum source for subjecting said particles, in said closed vessel, to a reduced pressure for a predetermined time to partially expand said particles to said predetermined density;

6. a feeder connected to the closed vessel for charging a controlled amount of coolant to said vessel while said particles in said closed vessel are subjected to vacuum;

7. a vent for releasing said vacuum; and 8. a source of compressed air for discharging said partially expanded particulate foamable polymer particles from said closed vessel.

* * * * *